United States Patent
Gennesson

(10) Patent No.: US 7,052,641 B2
(45) Date of Patent: *May 30, 2006

(54) PROCESS OF MAKING STRETCH WRAP FILM

(75) Inventor: Patrick Gennesson, Boulieu-les-Annonay (FR)

(73) Assignee: ITW Mima Films LLC, Glenview, IL (US)

(*) Notice: Subject to any disclaimer, the term of this patent is extended or adjusted under 35 U.S.C. 154(b) by 270 days.

This patent is subject to a terminal disclaimer.

(21) Appl. No.: 10/626,635

(22) Filed: Jul. 25, 2003

(65) Prior Publication Data

US 2005/0077652 A1    Apr. 14, 2005

Related U.S. Application Data

(63) Continuation of application No. 09/779,442, filed on Feb. 9, 2001, now Pat. No. 6,616,883.

(30) Foreign Application Priority Data

Feb. 9, 2000    (EP) .................................. 00300989

(51) Int. Cl.
   *B29C 55/06* (2006.01)
(52) U.S. Cl. .............................. 264/288.4; 264/342 RE
(58) Field of Classification Search ............ 264/288.4, 264/210.7, 211.12, 216, 342 RE, 564
   See application file for complete search history.

(56) References Cited

U.S. PATENT DOCUMENTS

| | | | | |
|---|---|---|---|---|
| 2,718,666 A | * | 9/1955 | Knox | 264/177.17 |
| 2,767,435 A | * | 10/1956 | Alles | 264/288.4 |
| 3,076,232 A | | 2/1963 | Dengler | |
| 3,619,460 A | * | 11/1971 | Chill | 264/288.4 |
| 3,734,994 A | * | 5/1973 | Blecha | 264/288.4 |
| 3,843,761 A | * | 10/1974 | Bierenbaum et al. | 264/154 |
| 4,076,698 A | | 2/1978 | Anderson et al. | |
| 4,205,021 A | | 5/1980 | Morita et al. | |
| 4,477,407 A | * | 10/1984 | Hetherington et al. | 264/288.4 |
| 5,017,323 A | * | 5/1991 | Balk | 264/288.4 |
| 5,076,976 A | * | 12/1991 | Aoki et al. | 264/484 |
| 5,241,030 A | * | 8/1993 | Barry et al. | 526/348.1 |
| 5,505,900 A | * | 4/1996 | Suwanda et al. | 264/477 |
| 5,695,698 A | * | 12/1997 | Ajji et al. | 264/40.1 |
| 5,695,709 A | * | 12/1997 | Van Erden et al. | 264/476 |
| 6,589,463 B1 | * | 7/2003 | Vogt et al. | 264/146 |
| 6,616,883 B1 | * | 9/2003 | Gennesson | 264/288.4 |
| 6,811,643 B1 | * | 11/2004 | McAmish et al. | 156/229 |

FOREIGN PATENT DOCUMENTS

EP    0 531 021 A1    3/1993

* cited by examiner

*Primary Examiner*—Mark Eashoo
(74) *Attorney, Agent, or Firm*—Lowe Hauptman Berner, LLP

(57) ABSTRACT

A method of making a plastics stretch film comprises the steps of taking a cast or blown film of LLDPE at a temperature of between 50° C. and 100° C., stretching it in two successive stretching steps, the first step having a stretch ratio higher than that of the second step, to cause both plastic and elastic deformation of the film. The film is then relaxed to substantially release all of the elastic deformation and winding the substantially relaxed film into rolls. Preferably, the first stretch ratio is in the range 1:1.70 to 1:1.80 and the second stretch ratio is in the range 1:1.85 to 1:1.95, and there is a reduction ratio of substantially 1:0.85 between the speed of the film during the second stretch rolling step and the speed of the film during wind-up.

18 Claims, 1 Drawing Sheet

PROCESS OF MAKING STRETCH WRAP FILM

This application is a continuation of U.S. patent application Ser. No. 09/779,442 filed Feb. 9, 2001, now U.S. Pat. No. 6,616,883, which is incorporated by reference herein in its entirety.

FIELD OF THE INVENTION

The invention is related to stretch wrap films that are used extensively in packaging to package discrete units together to form a unitary package and are also frequently used to attach a package to a palette, for example. Stretch wrap film may also be used as wrapping to protect a commodity from the environment during handling and transport.

BACKGROUND OF THE INVENTION

Stretch wrap may be applied by an automatic or semi-automatic machine which includes stretch rollers to pre-stretch the film before it is wrapped around a package. Alternatively the stretch wrap may be applied manually by applying the film from a roll supported on a simple hand-held mandrel. The present application has particular application to this latter category of stretch wrap material, and also to film for use on machines in which the amount of stretch prior to wrapping is low or zero.

EP-A-0531021 describes a process for producing a stretch wrap plastic film in which the film is "cold stretched" at ambient temperatures to thereby plastically and elastically stretch the film to cold orient it. The cold oriented film is then allowed to relax to recover substantially its elastic deformation before being formed into a roll. This arrangement provides a film wrap which is substantially as economical, and may be more economical, in film usage when applied by a hand wrapping device than other stretch wrapping films are when applied by automatic and semi-automatic machinery including power pre-stretching devices. The process described in this patent specification has been commercially successful but, in practice, it has not been possible to achieve consistently as high a stretch ratio as 1:4 suggested in the patent specification without experiencing difficulties due to film breakage.

SUMMARY OF THE INVENTION

According to this invention a method of making a plastics stretch film comprises the steps of taking a cast or blown film of LLDPE at a temperature of between 50° C. and 100° C., stretching it in two successive stretching steps, the first step having a stretch ratio higher than that of the second step, to cause both plastic and elastic deformation of the film, relaxing the stretched film substantially to release all of the elastic deformation and winding the substantially relaxed film into rolls.

Preferably, stretching is performed at a temperature of between 75° C. and 90° C.

By having a film in the temperature range specified above and stretching it in two successive stages it has been found that it is possible to produce more consistently a pre-stretched film. The film also has advantages in having a clearer, less opaque appearance.

Preferably the stretching of the film that occurs in the two successive steps has a stretch ratio in a range from 1:1.5 to 1:2.5 for each step. More preferably, the first stretch ratio is in the range 1:1.85 to 1:1.95 and the second stretch ratio is in the range 1:1.70 to 1:1.80. Preferably during the relaxing step there is a reduction ratio of substantially 1:0.85 between the speed of the film during the second stretch rolling step and the speed of the film during wind-up.

Preferably the temperature of the stretch film is substantially 80° C. during the stretching steps. The plastics film may be at this temperature by carrying out the stretching steps at an appropriate position downstream of a casting or blowing/extrusion production line so that the method in accordance with the present invention is carried out in line with the film production. Preferably however the method of the present invention is carried out out of line with the basic film production process and, in this case, the film is preferably re-heated, for example by being passed over one or more heated rollers immediately before the stretching steps.

The plastics material particularly preferred for the stretch film of the present invention is linear low density polyethylene (LLDPE). This material is a copolymer of ethylene with a $C_4$ to $C_{10}$ olefin; for example, butene-1,3-methyl-butene-1, hexene-1,3-methyl-pentene-1,4-methylpentene-1, 3-methyl-hexene-1, octene-1, decene-1 or a mixture thereof. The alpha-olefin is usually present in an amount from 1 to 10 weight percent of the copolymer. A typical manufacturing process for the formation thereof is disclosed in U.S. Pat. Nos. 4,076,698 and 4,205,021. The preferred LLDPE has a density ranging from 0.900 to 0.940 $g/cm^3$. This material preferably has a melt index of from 1 to 6. A multilayer film is also suitable, such as a multilayer film having a three layer A-B-C structure wherein the A layer comprises LVLDPE, the B layer comprises metallocene LLDPE and the C layer comprises LMDPE.

BRIEF DESCRIPTION OF THE DRAWING

A particular example of a process in accordance with this invention will now be described with reference to the accompanying drawing which is a diagrammatic illustration of the process.

DETAILED DESCRIPTION OF THE INVENTION

Figure 1:
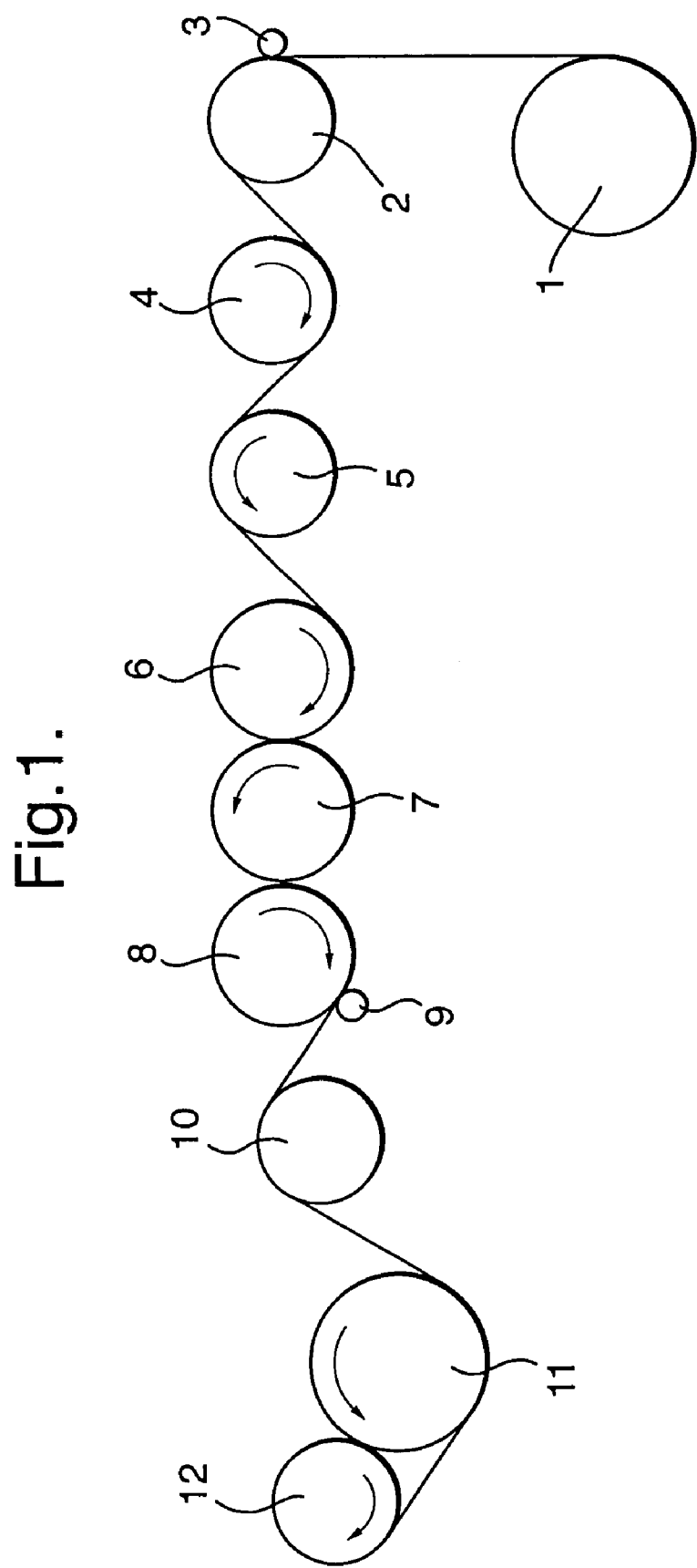

A plastics stretch film of 17, 20 or 23 μm thick material consisting of 100% LLDPE sold under the trade description 17, 20 or 23 UP 050 by Mima Films s.c.a. of 148 Route d'Arlon, L-8010 Strassen, Luxembourg is taken from a feed roll 1 through a nip formed between a first heater roller 2 and an idle roller 3. The film then passes around the top of heater roller 2 around the bottom of a heater roller 4 and around the top of a heater roller 5. All three heater rolls 2, 4 and 5 are provided with a re-circulating supply of oil heated to 80° C. Heater rollers 4 and 5 are driven in opposite senses at a peripheral speed of 65 metres per minute. The heater roller 2 idles. As the film passes over the heater rollers 2, 4, and 5 it is heated to a temperature of 80° C. The heater rollers are formed from a material having a high heat conductivity. Chrome rollers have been found to be particularly effective.

The heated film then passes beneath a first rubber covered stretch roller 6 which has a peripheral speed of 66 metres per minute. A second rubber covered stretch roller 7 is located very close to stretch roller 6, 1 mm or less, and is driven in the opposite sense to the first stretch roller 6 at a peripheral speed of 126 metres per minute. This stretches the film with a stretch ratio of 1:1.91, or 91% stretch. A third stretch roller 8 which is again located physically close to stretch roller 7 at a spacing of 1 mm or less is driven in the same sense as the first stretch roller 6 at a peripheral speed of 217 metres per minute. This stretches the film with a further stretch ratio of 1:1.72 or 72% stretch. An idler roller 9 creates a nip with the third stretch roller 8 to prevent slippage of the plastics film. As the film passes between the stretch rollers 6 and 7 and stretch rollers 7 and 8 it is stretched in two steps with a total stretch ratio of 1:3.3 or a stretch of 230%. The close proximity of the stretch rollers 6 and 7 and 7 and 8 prevent substantial necking-down of the plastics film material during its stretching.

The film leaving the nip between the third stretch roller 8 and the idler roller 9 then passes over a third idler roller 10 before passing around the surface of a polished roller 11 which has a peripheral surface moving in the opposite direction to the direction of movement of the film, before being wound on a core to provide an output roll 12 driven by being pressed against the surface of the roller 11. The roller 11 has a peripheral speed of 185 metres per minute and thus there is a difference ratio of 1:0.85 between the peripheral speed of the third stretch roller 8 and that of the wind up roller 12 which is sufficient to allow substantial relaxation of the film before it is wound up. Thus, the plastics film from the feed roller 1 is subjected to a total stretch of 1:3.3 followed by a relaxation of 1:0.85 leading to a total stretch ratio of 1:2.85. The typical thickness of the stretched output material is 6.8, 8 or 9 µm.

The invention claimed is:

1. A method of making a plastics stretch film, said method comprising the steps of:
   a) taking a cast or blown film of plastic material;
   b) causing both plastic and elastic deformation of the film by stretching the film in two successive first and second stretching steps to form a stretched film, said first step having a stretch ratio higher than that of said second step;
   c) relaxing said stretched film substantially to release all of the elastic deformation to form a substantially relaxed film; and
   d) winding said substantially relaxed film into a roll;
   said method further comprising:
   providing a plurality of rollers arranged successively between a film supply, from which said film is taken and said roll;
   passing said film from said film supply, successively through said rollers, to said roll at various speeds to perform said first and second stretching steps and said relaxing step, wherein said first and second stretching steps are performed between first and second pairs of successive said rollers, respectively; and
   preventing a substantial necking down of the film being stretched by positioning the rollers of at least one of said first and second pairs sufficiently close to each other;
   wherein the rollers of said first pair are physically spaced at 1 mm or less and the rollers of said second pair are physically spaced at 1 mm or less.

2. The method of claim 1, wherein the temperature of said film is between 75° C. and 90° C. during said stretching steps.

3. The method of claim 2, wherein the temperature of said film is substantially 80° C. during said stretching steps.

4. The method of claim 1, wherein the stretching of the film that occurs in said first step has a stretch ratio in a range from 1:1.85 to 1:1.95.

5. The method of claim 4, wherein the stretching of the film that occurs in said second step has a stretch ratio in the range 1:1.70 to 1:1.80.

6. The method of claim 1, wherein the stretching of the film that occurs in said second step has a stretch ratio in the range 1:1.70 to 1:1.80.

7. The method of claim 1 wherein the stretching of the film that occurs in said first step has a stretch ratio in the range 1:1.85 to 1:1.95.

8. The method of claim 7, wherein the temperature of said film is between 75° C. and 90° C. during said stretching steps.

9. The method of claim 7, wherein the stretching of the film that occurs in said second step has a stretch ratio in the range 1:1.70 to 1:1.80.

10. The method of claim 7, wherein the plastic material is LLDPE.

11. The method of claim 1, wherein the stretching of the film that occurs in said two successive steps has a stretch ratio in arrange from 1:1.5 to 1:2.5 for each step.

12. The method of claim 1, wherein the plastic material is LLDPE.

13. The method of claim 1, wherein said first and second pairs share one common roller.

14. The method of claim 1, further comprising
    positioning a polishing roller upstream of said roll; and
    polishing said relaxed film with said polishing roller prior to said winding, wherein said polishing comprises rotating said polishing roller in a direction opposite to that of the relaxed film being wound onto said roll.

15. The method of claim 14, further comprising driving said roll by said polishing roller which is pressed against said roll.

16. A method of making a plastics stretch film, said method comprising the steps of:
    taking a cast or blown film of plastic material;
    causing both plastic and elastic deformation of the film by stretching the film in two successive first and second stretching steps to form a stretched film, said first step having a stretch ratio higher than that of said second step;
    relaxing said stretched film to form a substantially relaxed film; and
    winding said substantially relaxed film into a roll;
    said method further comprising:
    providing a plurality of rollers arranged successively between a film supply, from which said film is taken, and said roll;
    passing said film from said film supply, successively through said rollers, to said roll at various speeds to perform said first and second stretching steps and said relaxing step, wherein said first and second stretching steps are performed between first and second pairs of successive said rollers, respectively; and
    preventing a substantial necking down of the film being stretched by positioning the rollers of said first pair sufficiently close to each other and positioning the rollers of said second pair sufficiently close to each other;
    wherein an upstream roller of said first pair is closer to a downstream roller of said first pair than to the rollers located upstream of said first pair; and
    wherein a downstream roller of said second pair is closer to an upstream roller of said second pair than to the rollers located downstream of said third pair; and
    wherein the rollers of said first pair are physically spaced at 1 mm or less and the rollers of said second pair are physically spaced at 1 mm or less.

17. The method of claim 16, wherein said first and second pairs share one common roller with the downstream roller of said first pair and the upstream roller of said second pair being one and the same.

18. The method of claim 16, wherein one of said roller is a polishing roller positioned upstream of said roll and downstream of said second pair; said method further comprising polishing said relaxed film prior to said winding by rotating said polishing roller in a direction opposite to that of the relaxed film being wound onto said roll.

* * * * *